United States Patent [19]

Martin

[11] Patent Number: 5,232,007
[45] Date of Patent: Aug. 3, 1993

[54] COMBINATION OF A FUEL MANIFOLD AND A PLURALITY OF LIKE FUEL CONTROL DEVICES MOUNTED THERETO, A MANIFOLD FOR SUCH COMBINATION AND METHODS OF MAKING THE SAME

[75] Inventor: David D. Martin, Dunbar, Pa.

[73] Assignee: Robertshaw Controls Company, Richmond, Va.

[21] Appl. No.: 914,800

[22] Filed: Jul. 16, 1992

[51] Int. Cl.⁵ .............................................. F16L 55/18
[52] U.S. Cl. .......................................... 137/15; 137/315; 137/343; 137/883; 137/884; 123/39 N; 123/42
[58] Field of Search ................. 431/343; 126/39 N, 42; 137/883, 884, 887, 343, 15, 315; 251/143; 123/456

[56] References Cited

U.S. PATENT DOCUMENTS

| | | | |
|---|---|---|---|
| 2,292,735 | 8/1942 | Resocke | 126/42 |
| 2,489,611 | 11/1949 | Becvar | 126/42 |
| 3,804,118 | 4/1974 | Love et al. | 137/883 |
| 4,177,835 | 12/1979 | Patey | 137/883 |
| 5,020,570 | 6/1991 | Cotter | 137/884 |
| 5,027,854 | 7/1991 | Genbauffe | 137/599.2 |

FOREIGN PATENT DOCUMENTS 465847 8/1937 United Kingdom ............. 126/39 N

Primary Examiner—A. Michael Chambers
Attorney, Agent, or Firm—Candor, Candor & Tassone

[57] ABSTRACT

A combination of a fuel manifold and a plurality of like fuel control devices mounted thereto, a manifold for such a combination and methods of making the same are provided, the combination comprising a fuel manifold having a fuel receiving chamber therein and a plurality of like fuel control devices mounted to the manifold and having inlet projections extending into the manifold to receive fuel from the chamber thereof, the manifold having a pair of opposed spaced apart substantially flat front and rear walls and a pair of opposed spaced apart substantially flat side walls interconnecting the front and rear walls together, one of the side walls having a plurality of spaced apart openings therethrough and through which the inlet projections of the control devices respectively extend, the side walls being spaced apart a distance that will permit two of the control devices to have the inlet projections thereof respectively extend through aligned openings in the side walls so that two of the control devices can be respectively mounted to the manifold in aligned relation on opposite sides thereof.

7 Claims, 7 Drawing Sheets

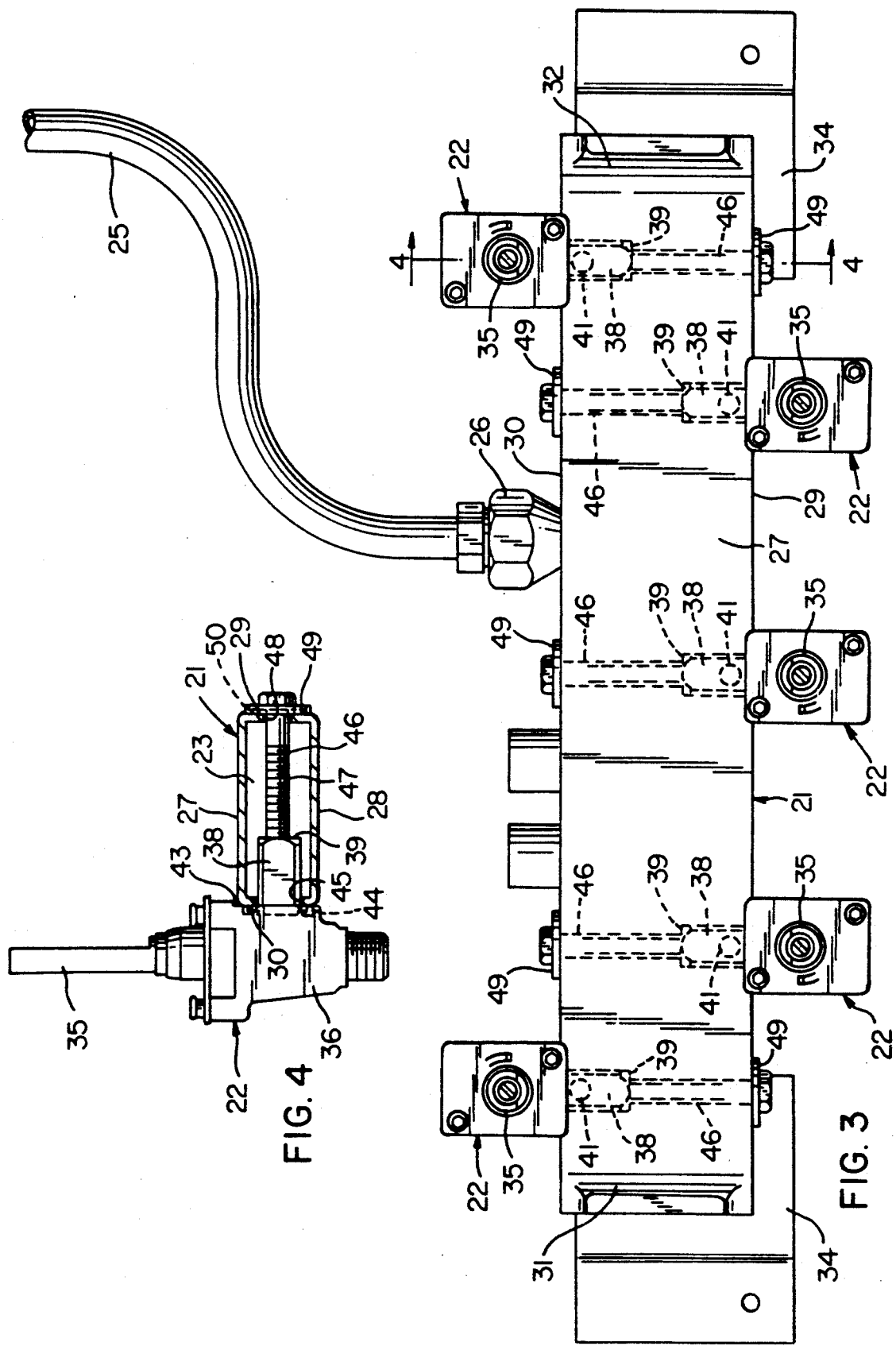

COMBINATION OF A FUEL MANIFOLD AND A PLURALITY OF LIKE FUEL CONTROL DEVICES MOUNTED THERETO, A MANIFOLD FOR SUCH COMBINATION AND METHODS OF MAKING THE SAME

BACKGROUND OF THE INVENTION

1. Field of the Invention

This invention relates to a new combination of a fuel manifold and a plurality of like fuel control devices mounted thereto as well as to a new manifold for such a combination and to new methods of making such a combination and such a manifold.

2. Prior Art Statement

It is known to provide a combination of a fuel manifold having a fuel receiving chamber therein and a plurality of like fuel control devices mounted to the manifold and having inlet projections extending into the manifold to receive fuel from the chamber thereof, the manifold having a pair of opposed spaced apart substantially flat front and rear walls and a pair of opposed spaced apart substantially flat side walls interconnecting the front and rear walls together, one of the side walls having a plurality of spaced apart openings therethrough and through which the inlet projections of the control devices respectively extend.

SUMMARY OF THE INVENTION

It is one of the features of this invention to provide a new combination of a fuel manifold and a plurality of like fuel control devices mounted to the manifold with the manifold being adapted to accommodate the mounting of two of the control devices in aligned relation on opposite sides of the manifold.

In particular, it was found according to the teachings of this invention that prior known fuel manifolds are each made of a size that accommodate multi-line mounting of a plurality of like fuel control devices thereto with such fuel control devices either being all mounted on the same side of the manifold or on opposite sides thereof in a staggered relationship whereby two of such control devices cannot be mounted in aligned relation on opposite sides of such prior know manifold.

Therefore, it was found according to the teachings of this invention that a manifold can be provided that has the necessary dimensions for the opposed side walls thereof to permit like fuel control devices to be mounted to the manifold by having inlet projections thereof extending into the manifold through properly located openings in the side walls and that the front and rear walls that interconnect the side walls together can be of such a size that the manifold will permit two of the control devices to be respectively mounted in aligned relation on opposite sides thereof.

For example, one embodiment of this invention provides a combination of a fuel manifold having a fuel receiving chamber therein and a plurality of like fuel control devices mounted to the manifold and having inlet projections extending into the manifold to receive fuel from the chamber thereof, the manifold having a pair of opposed spaced apart substantially flat front and rear walls and a pair of opposed spaced apart substantially flat side walls interconnecting the front and rear walls together, one of the side walls having a plurality of spaced apart openings therethrough and through which the inlet projections of the control devices respectively extend, the side walls being spaced apart a distance that will permit two of the control devices to have the inlet projections thereof respectively extend through aligned openings in the side walls so that those two control devices can be respectively mounted to the manifold in aligned relation on opposite sides thereof.

Accordingly, it is an object of this invention to provide a new combination of a fuel manifold and a plurality of like fuel control devices mounted to the manifold, the combination of this invention having one or more of the novel features of this invention as set forth above or hereinafter shown or described.

Another object of this invention is to provide a new method of making a combination of a fuel manifold and a plurality of like fuel control devices mounted to the manifold, the method of this invention of having one or more of the novel features of this invention as set forth above or hereinafter shown or described.

Another object of this invention is to provide a new fuel mainfold for having a plurality of like fuel control devices mounted thereto, the manifold of this invention having one or more of the novel features of this invention as set forth above or hereinafter shown or described.

Another object of this invention is to provide a new method of making such a manifold, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

BRIEF DESCRIPTION OF THE DRAWINGS

FIG. 3 is an enlarged front view of the combination of FIG. 1.

FIG. 4 is a cross-sectional view taken on line 4—4 of FIG. 3.

DESCRIPTION OF THE PREFERRED EMBODIMENTS

Figure 1:
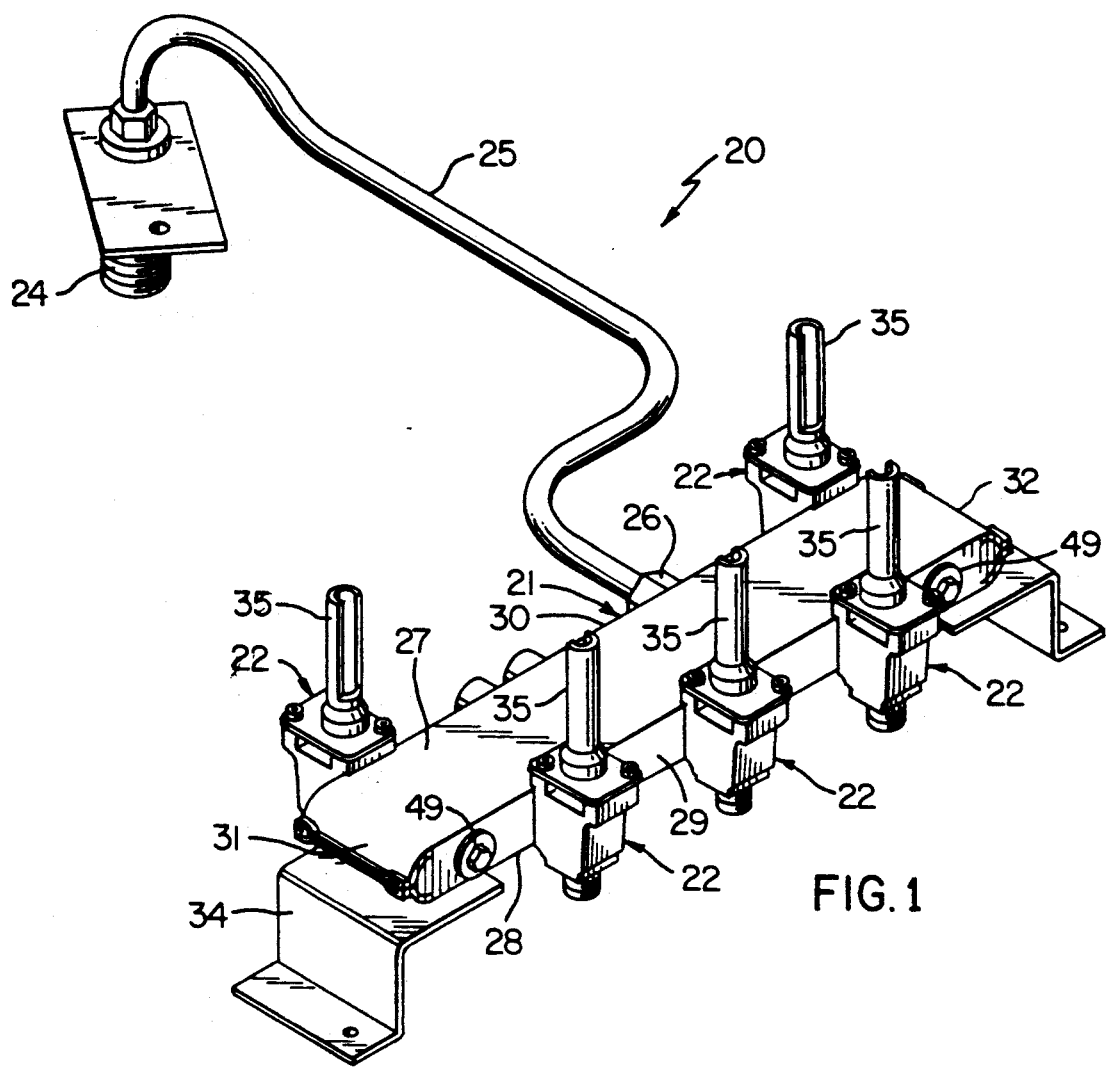
FIG. 1 is a perspective view of the new combination of this invention that comprises a fuel manifold having a plurality of like fuel control devices mounted thereto.

While the various features of this invention are hereinafter illustrated and described as being particularly adapted to provide a combination of a fuel manifold having a plurality of like fuel control devices mounted thereto with the control devices being of a certain type, it is to understood that the various features of this invention can be utilized singly or various combinations thereof to provide a combination of a fuel manifold for other types of fuel control devices as desired.

Therefore, this invention is not to be limited to only the embodiment illustrated in the drawings, because the drawings are merely utilized to illustrate one of the wide variety of uses of this invention.

Referring now to FIG. 1, one of the new combinations of this invention is generally indicated by the reference numeral 20 and comprises a fuel manifold that is generally indicated by the reference numberal 21 and a plurality of like fuel control devices that are each generally indicated by the reference numeral 22 mounted to the manifold 21 in a manner hereinafter set forth, the manifold 21 being adapted to have fuel, such as natural or synthetic gas, directed into an internal chamber 23 thereof, FIG. 4, from a remotely located externally threaded inlet tube 24 that is connected thereto by a pipe or tubing link 25 threaded into an internally threaded fitting 26 that is interconnected to the manifold 21 in a manner well known in the art.

However, it is to be understood that the threaded inlet tube or fitting 24 can be directly interconnected to the manifold 21 if desired in the manner provided of the other embodiments of this invention as will be apparent hereinafter.

The manifold 21 of this invention can be formed of any suitable material, such as metallic material and formed in a rectangular configuration to comprise a pair of opposed spaced apart substantially flat front and rear walls 27 and 28 and a pair of opposed spaced apart substantially flat side walls 29 and 30 interconnecting the front and rear walls 27 and 28 together, the manifold 21 being a one piece extruded member or comprising a plurality of parts sutiably secured together, if desired. In any event, the manifold has opposed ends 31 and 32 that are sealed closed by suitable forming dies that collapse the walls 27, 28, 29 and 30 into the configuration that is generally indicated by the reference numeral 33 in FIG. 2 so as to substantially seal the chamber 23 in the manifold 21.

If desired, suitable angled brackets 34 can be secured at the opposed ends 31 and 32 of the manifold 21 at the rear wall 28 thereof to subsequently mount the combination 20 in a suitable cooking apparatus (not shown) so as to position the front wall 27 thereof in a proper location for the control shafts 35 of the control devices 22 as will be apparent hereinafter.

The control devices 22 illustrated in the drawings are of the type that are fully disclosed in the U.S. patent to Genbauffe, U.S. Pat. No. 5,027,854, whereby this U.S. patent is being incorporated into this disclosure by this reference thereto.

Since the general structure of the fuel control device 22 and its operation are now well known in the art, only the details thereof that are believed necessary to understand the features of this invention will now be described.

Each fuel control device 22 comprises a housing block 36 that carries its respective rotatable shaft 35 for controlling valve means (not shown) in the block 36 through the rotation of the shaft 35 that normally has a control knob (not shown) mounted thereon in a conventional manner. The housing block 36 has a generally flat surface means 37 and a substantially rectangular inlet projection 38 extending outwardly therefrom, the inlet projection having an outer free end 39 through which an internally threaded opening 40 is provided that leads to the valve means inside the housing means 36. The inlet projection 38 also has an inlet opening 41 provided in one of the flat side walls 42 thereof to receive fuel therein from the chamber 23 of the manifold 21 when that control devide 22 is mounted thereto in a manner hereinafter set forth, the inlet opening 41 interconnected with the threaded opening 40.

Figure 2:
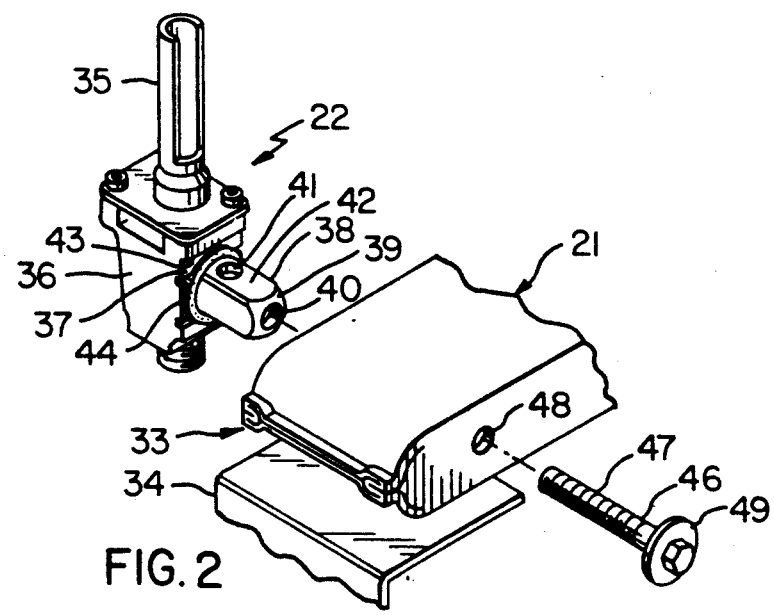
FIG. 2 is a fragmentary exploded perspective view of a part of the combination of FIG. 2.

The housing block 36 of each fuel control device 22 has a substantially straight shoulder or ledge 43 extending outwardly from the surface means 37 thereof in spaced relation to an annular flexible sealing member 44 that is carried by the housing block 36 and is telescopically disposed on the inlet projection 38 so as to be disposed against the surface means 37 thereof as illustrated in FIG. 2.

The side walls 29 and 30 of the manifold 21 have a plurality of rectangular openings 45, FIG. 4, formed therethrough in the desired positions for mounting the control devices 22 in the cluster arrangment thereof as illustrated in the drawings, the cluster arrangment comprising three control devices 22 mounted in spaced apart aligned relation along the side wall 29 and two control devices 22 mounted in spaced apart aligned relation along the side wall 30 outboard of the control devices 22 on the side wall 29 for a particular cooking apparatus spplication of the combination 20.

Each control device 22 has its inlet projection 38 inserted through the respective opening 45 and a threaded fastening member 46 has an externally threaded shank portion 47 thereof inserted through an opening 48 formed in the opposite side wall of the manifold 21 from the side wall to which control device 22 is to be mounted so as to be threadly received in the threaded opening 40 of the inlet projection 38 in the manner illustrated in FIG. 4 so that an enlarged head 49 on the fastening member 46 will compact a resillient annular sealing member 50, FIG. 4, against the opposite side wall 29 in the manner illustrated in FIG. 4 while compacting the annular sealing member 44 of the control device 22 against the side wall 30. In this manner, both aligned openings 45 and 48 are respectively sealed closed by the annular sealing members 44 and 50 with the housing body 36 of the control device 22 being fastened against the wall 30 of the manifold 21 with its ledge 43 extending over the top wall 27 as illustrated in FIG. 4.

Accordingly, each of the control devices 22 can be individually mounted to the manifold means 21 by its respective fastening member 46 so as to position the control devices 22 in their mounted relation as illustrated in FIGS. 1 and 3.

In this manner, the inlet openings 41 of the control devices 22 are in flud communication with the chamber 23 in the manifold 21 to receive fuel therefrom and, thus, from the inlet conduit 24 whereby each control shaft 35 can be turned to an "On" position to permit the fuel to flow through the housing body 36 thereof and out of an outlet means 51 thereof in the manner fully set forth in the aforementioned U.S. Genbauffe, U.S. Pat. No. 5,027,854.

While the manifold arrangement 20 illustrated in FIGS. 1-4 does not have any of the control devices 22 arranged in aligned relation on opposite sides of the manifold 21, it will be apparent hereinafter that the distance provided between the opposed side walls 29 and 30 of the manifold 21 would permit a pair of the control devices 22 to be respectively mounted on opposite sides of the manifold in aligned relation.

While the manifold 21 illustrated in FIGS. 1-4 can have any suitable dimensions, one working embodiment thereof is formed from rectangular steel tubing having a wall thickness of approximately 0.049 of an inch, having the front and rear walls 27 and 28 each with a width of approximately 1.800 inches, having the side walls 29 and 30 each with a width of approximately 0.750 of an inch and having a length between the opposed ends 31 and 32 of approximately 10.000 inches.

The control devices 22 that are utilized with such working embodiment of the manifold 21 each have the inlet projection 38 there with a length of approximately ⅜ of an inch whereby it can be seen that two control devices 22 could be mounted in aligned relation on opposite sides of the manifold 21, if desired.

Another new combination of this invention is generally indicated by the reference numberal 20A and parts thereof similar to the parts of the combination 20 previously described are indicated by like reference numerals followed by the reference letter "A".

Referring now to FIGS. 5-8, the combination 20A of this invention comprises a manifold means 21A having a plurality of fuel control devices 22A mounted thereto, the manifold 21A having opposed front and rear walls 27A and 28A and opposed side walls 29A and 30A.

A threaded inlet pipe 24A is directly interconnected to the rear wall 28A in any suitable manner, such as by welding to feed fuel into the chamber 23A of the manifold 21A and carries a mounting plate 34A for mounting the combination 20A in a cooking apparatus so as to properly position the selector shafts 35A of the control devices 22A for the reasons 20 previously set forth.

Figure 7:
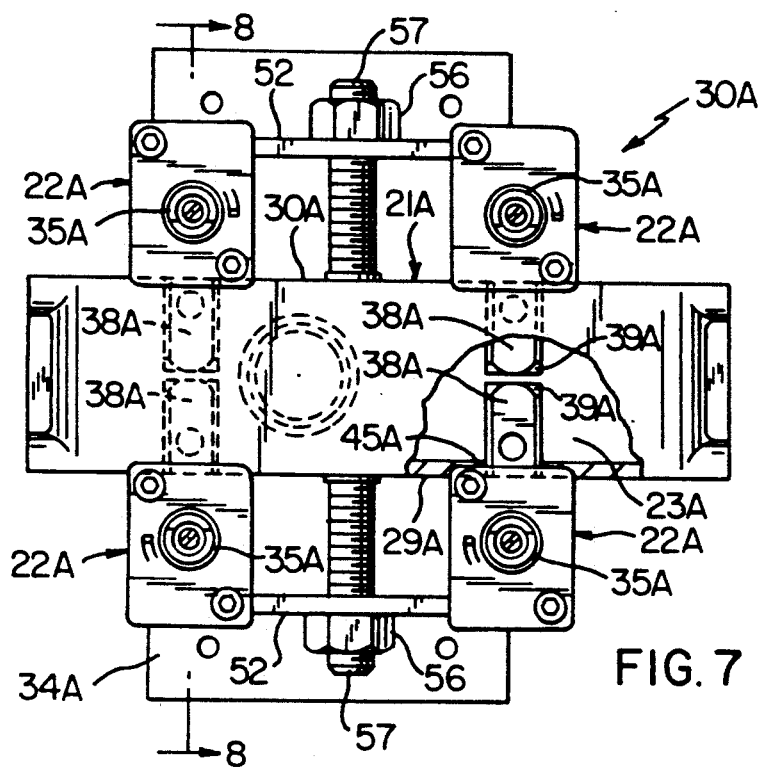
FIG. 7 is an enlarged front view of the combination of FIG. 5.
Figure 8:
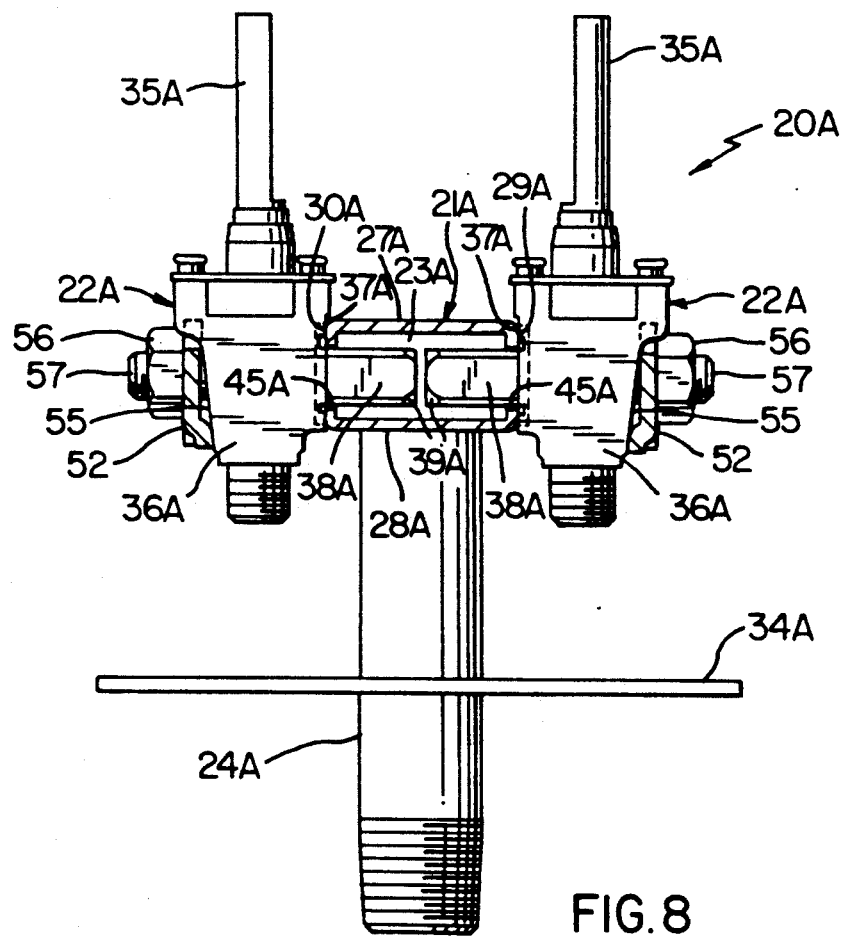
FIG. 8 is a cross-sectional view taken on line 8—8 of FIG. 7.
Figure 9:
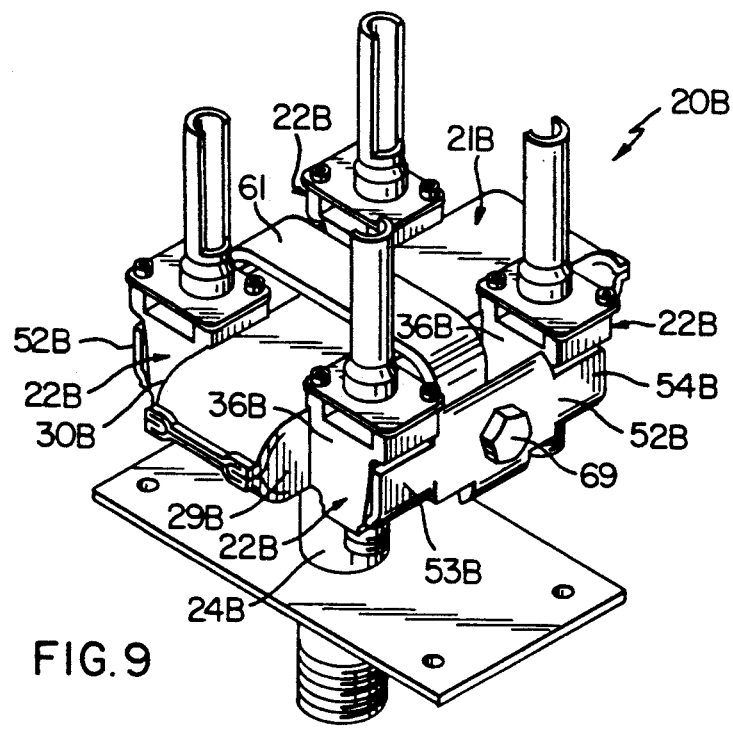
FIG. 9 is a view similar to FIG. 5 and illustrates another new combination of this invention wherein a plurality of like fuel control devices are mounted to a fuel manifold.
Figure 10:
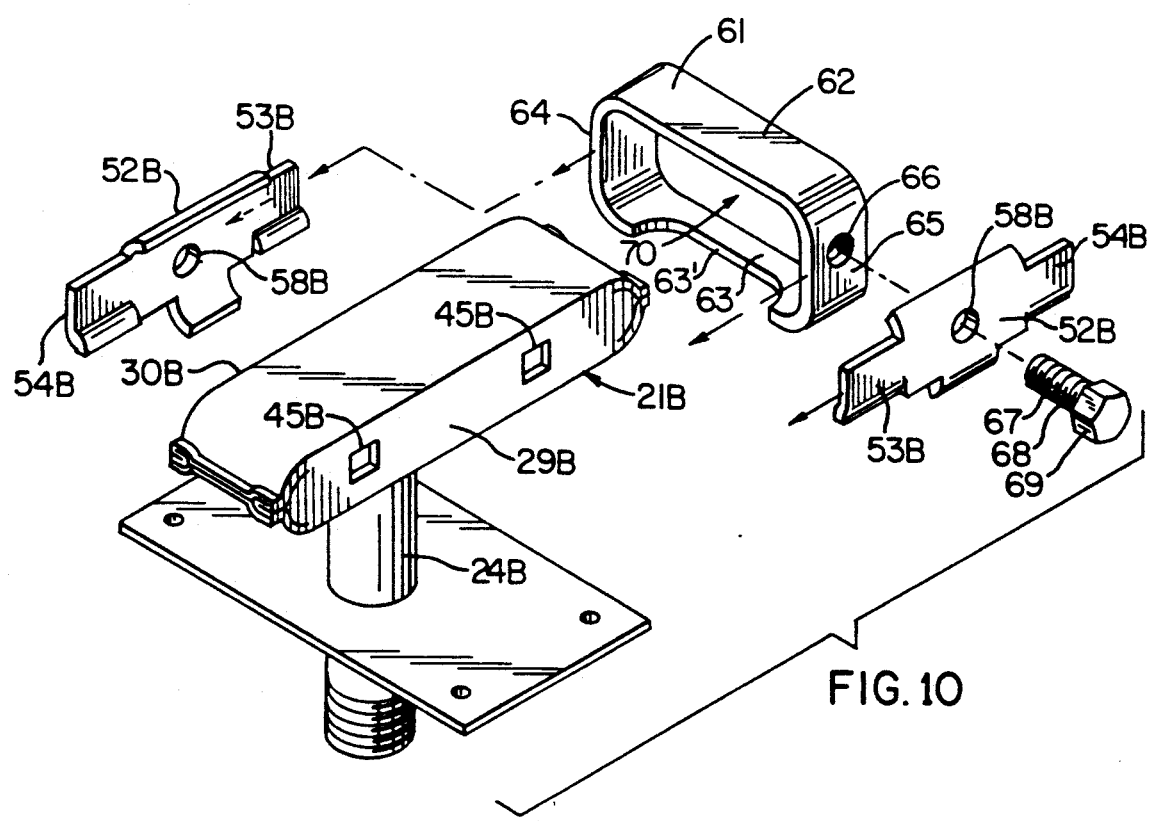
FIG. 10 is an exploded perspective view of certain parts of the combination of FIG. 9.

Four fuel control devices 22A are mounted to the manifold 21A with two of the control devices 22A being mounted on the side wall 29A and two other of the control devices 22A being mounted on the side wall 30A respectively in aligned relation with the control devices 22A being mounted on the side wall 29A as best illustrated in FIGS. 7 and 8.

The control devices 22A respectively have the inlet projections 38A thereof disposed through the respective openings 45A in the walls 29A and 30A as illustrated in FIG. 7 and are uniquely held in the mounted position thereof by brackets 52 each having opposed ends 53 and 54 respectively engaging against surface means 55 on the housing bodies 36A of its respective pair of fuel control devices 22A so as to compact the surfaces 37A thereof toward the respective side wall 29A or 30A as the respective bracket 52 is urged toward that respective side wall 29A or 30A by the threading of a nut 56 on a threaded post 57 having been fastened to and extending outwardly from the respective side wall 29A or 30A as illustrated, each threaded post 57 extending through a suitable opening 58 formed in the medial portion of the respective bracket 52 as illustrated.

Each bracket 52 can have the ends 53 and 54 thereof formed with L-shaped shoulders 59 that cooperate with ledge means 60 on the sides 55 of the control devices 22 in the manner illustrated to assist in preventing the control devices 22A from rotating in their mounted positions.

Thus, it can be seen that each bracket 52 is adapted to secure two control devices 22A in their mounted position to the manifold 21A.

It can also be seen from FIGS. 7 and 8 that the two control devices 22A mounted by each bracket 52 to the manifold 21A are in direct aligned relation with the other pair of control devices 22A as the width of the front and rear walls 27A and 28A of the manifold 21A is such that there is still spacing between the free ends 39A of the inlet projections 38A of the aligned control devices 22A.

For example, in one working embodiment of the combination 20A of this invention, the projections 38A on the control devices 22A are each approximately ⅜ of an inch long as previously set forth and the manifold 21A is formed of the aforementioned rectangular steel tubing having a wall thickness of approximately 0.049 of an inch, having the front and rear walls 27A and 29A each with a width of approximately 1.330 of an inch, having the side walls 29A and 30A each with a width of approximately 0.750 of an inch and having a length between the opposed ends 31A and 32A thereof of approximately 4.875 inches.

Because of the construction of the particular cooking apparatus adapted to receive the combination 20A previously described, the inlet tubing 24A is offset closer to the end 31A than to the end 32A as best illustrated in FIG. 7.

Figure 5:
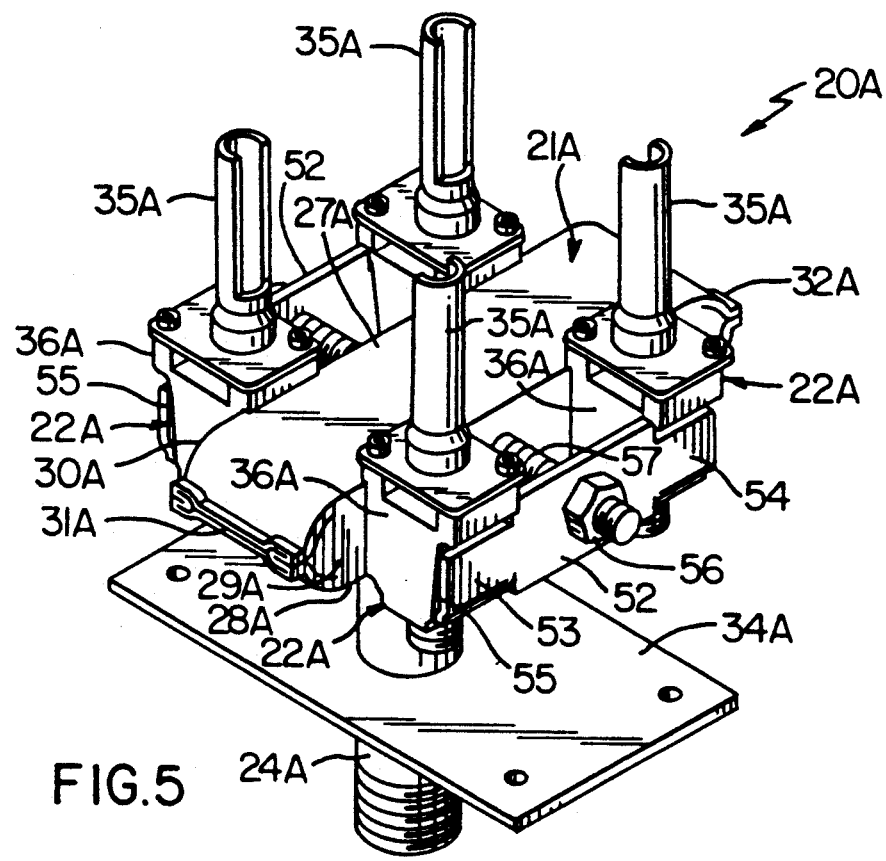
FIG. 5 is a perspective view of another new combination of this invention wherein a plurality of like fuel control devices are mounted to a fuel manifold.
Figure 6:
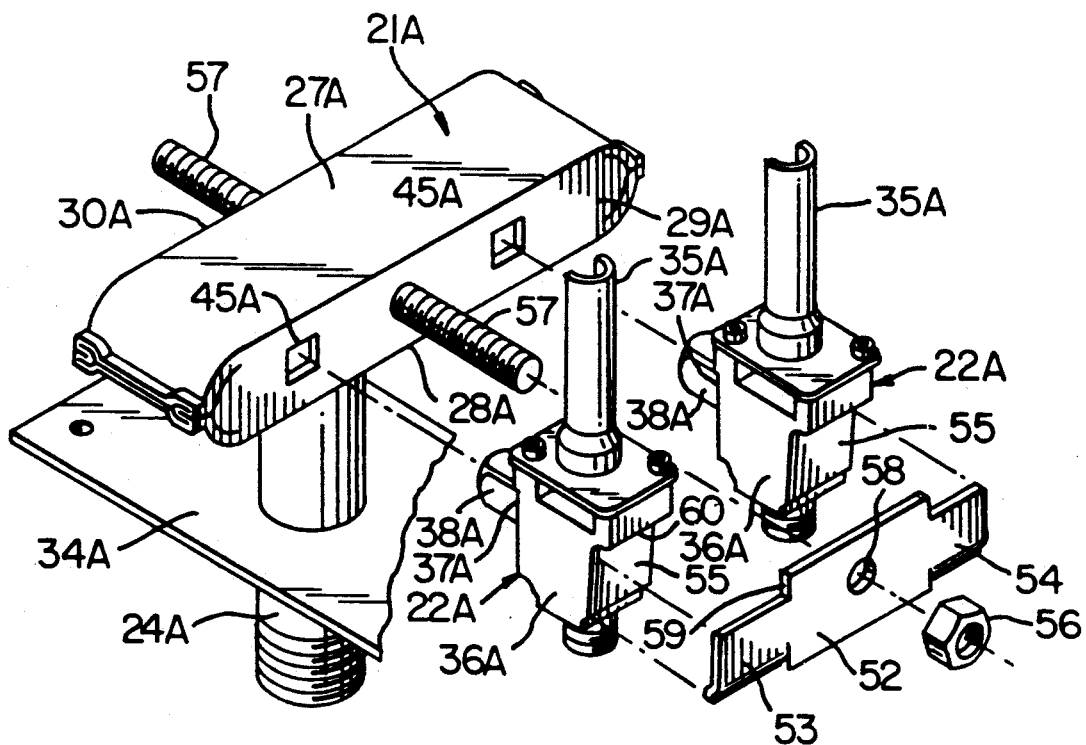
FIG. 6 is a fragmentary and exploded perspective view of certain of the parts of the combination of FIG. 5.

Thus, it can be seen that it is a relatively simple method of this invention to form the combination 20A of this invention by first inserting the inlet projections 38A of the pair of control devices 22A into their respective openings 45A of the side wall 29A or 30A and then utilizing a bracket 52A to hold the same in place by receiving the respective threaded post 57 through the opening 58 thereof and then tightening the nut 56 on the threaded post 57A in the manner illustrated in FIG. 5. The other pair of control devices 22A are then mounted to the other side wall 30A or 29A by their respective bracket 52 in a like manner.

Another new combination of this invention is generally indicated by the reference numeral 20B in FIGS. 9-14 and parts thereof similar to the parts of the combinations 20 and 20A previously described are indicated by like reference numerals followed by the reference letter "B".

As illustrated in FIGS. 9-14, the combination 20B is substantially the same as the combination 20A previously described except that the brackets 52B that respectively hold two control devices 22B against the respective side walls 29B and 30B of the manifold means 21B are not carried by the threaded posts 57 previously described but are held in place by a bracket member or endless strap 61 that is substantially rectangular in configuration, the strap 61 being formed of any suitable material, such as metallic material and having opposed front and rear walls 62 and 63 and opposed side walls 64 and 65. The strap 61 as illustrated is so dimensioned that the same functions in the unique manner hereinafter set forth.

The wall 65 of the endless strap 62 has a threaded opening 66 passing therethrough to receive the externally threaded shank 67 of a threaded fastening member 68 that has an enlarged head 69 in a manner hereinafter set forth.

The strap 61 can be a one-piece member and the wall 63 has a cut-out 63' therein to accommodate the inlet tube 24B of the manifold 21B as will be apparent hereinafter.

Figure 12:
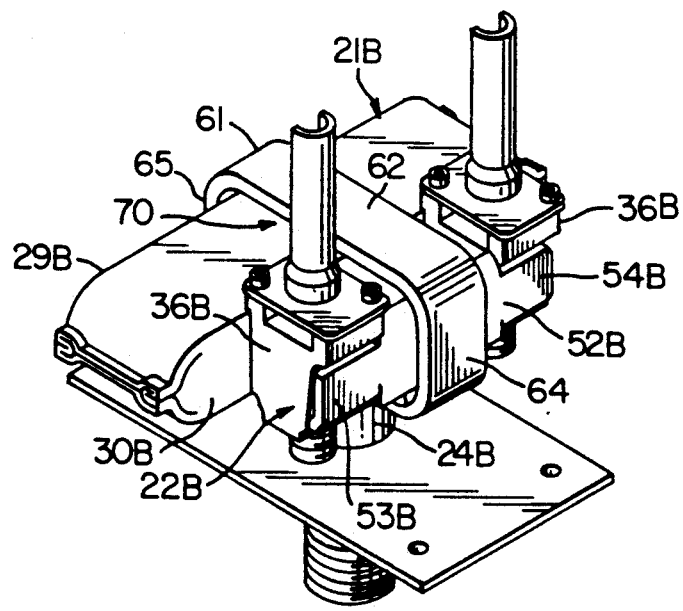
FIG. 12 is a perspective view illustrating how two of the control devices are mounted to one side of the manifold of FIG. 9.

The walls 62–65 of the endless strap 61 define an opening 70 that passes therethrough to permit the strap 62 to encircle the manifold 21B and permit the wall 64 to be disposed against the side wall 29B of the manifold 21B as illustrated in FIG. 12.

Figure 13:
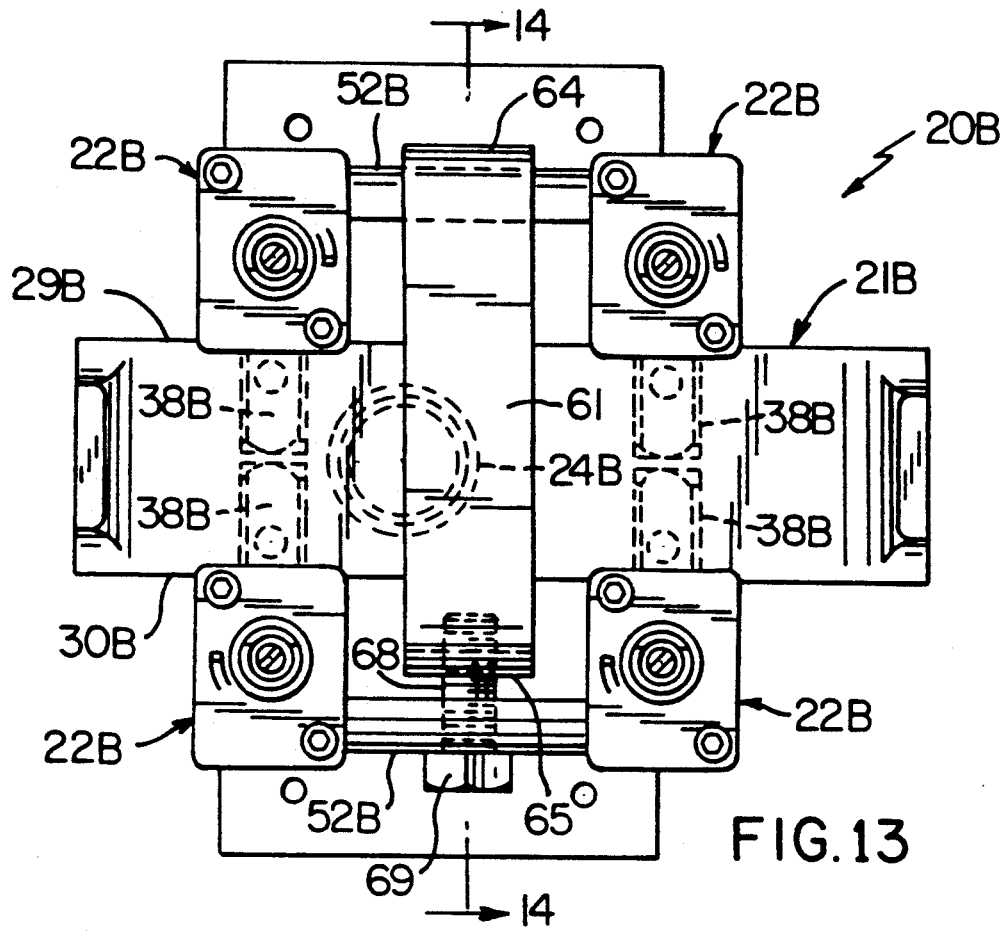
FIG. 13 is a front view of the combination of FIG. 9.
Figure 14:
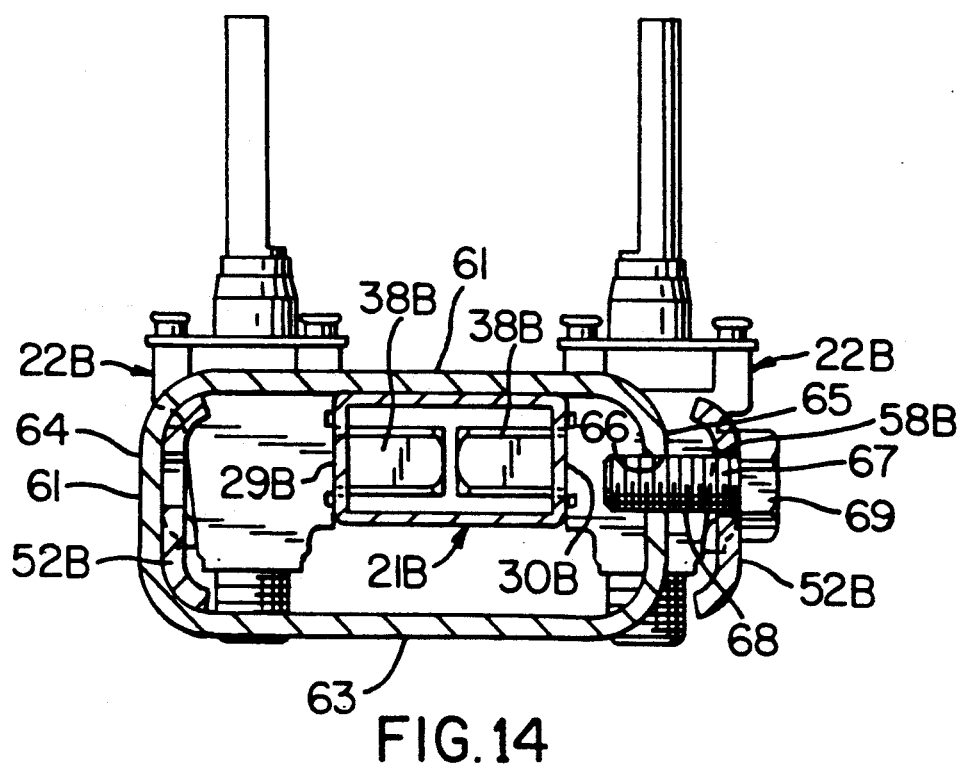
FIG. 14 is a cross sectional view taken on line 14—14 of FIG. 13.

In this position, two of the control devices 22B can have the inlet projections 38B thereof inserted into the openings 45B in the side wall 30B and then have the bracket 52B therefor inserted through the opening 70 of the strap 61 so that the opposed ends 53B and 54B thereof will respectively be disposed against the housing bodies 36B of the control devices 22B as illustrated in FIG. 12 to be subsequently compacted thereagainst when the wall 65 of the strap 61 is pulled outwardly from the wall 29B by the fastening member 68 as illustrated in FIGS. 13 and 14.

Figure 11:
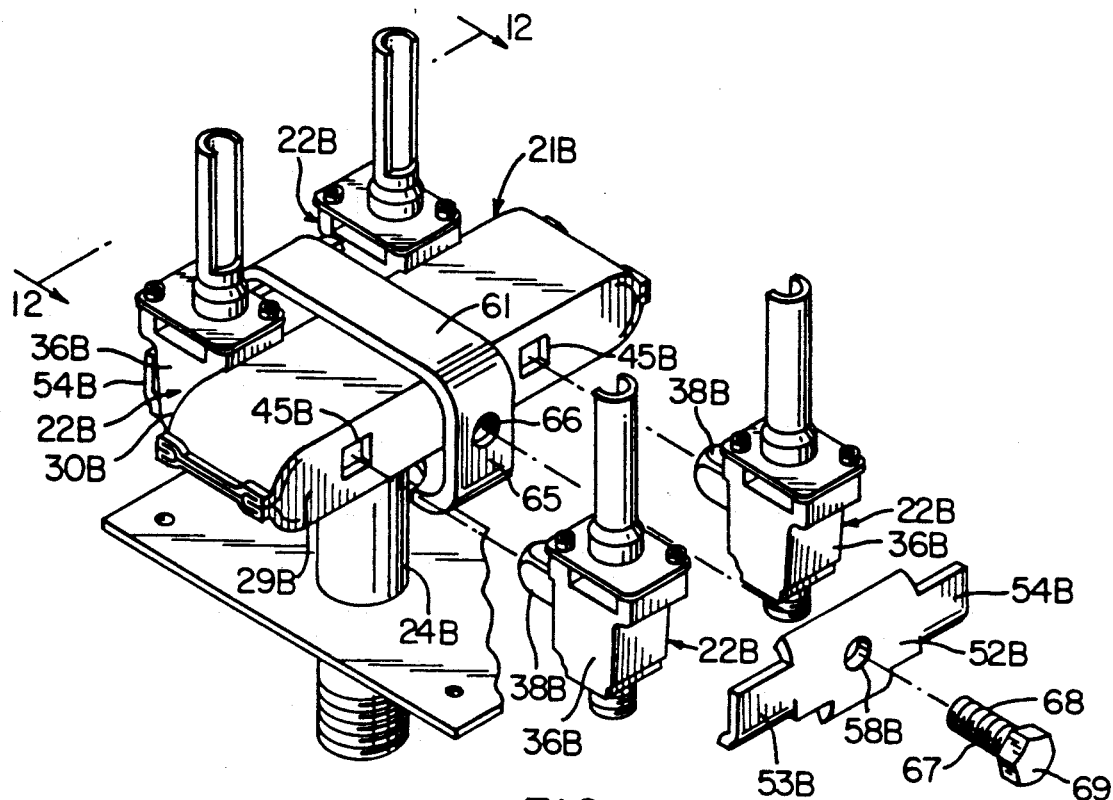
FIG. 11 is an exploded perspective view of some of the parts of the combination of FIG. 9.

In particular, the two other control devices 22B are then mounted to the wall 29B of the manifold 21B in the manner illustrated in FIG. 11 and then the bracket 52B therefore is disposed against those control devices 22B. Thereafter, the threaded fastening member 68 has its shank 67 inserted through the opening 58B in the bracket 52B and is inserted into the threaded opening 66 of the endless strap 61 and threaded therein to pull the strap 61 outwardly from the side wall 29B of the manifold 21B as well as to urge the bracket 52B and its abutted control devices 22B toward the side wall 29B in the manner illustrated in FIGS. 13 and 14.

Thus, the endless strap 61 permits only a single threaded fastening member 68 to be utilized therewith to hold four control devices 22B to the manifold 21B in the cluster arrangement illustrated wherein the two control devices 22B being mounted to the side wall 29B are in alignment with the two control devices 22B being mounted to the side wall 30B as illustrated.

In this manner, the manifold 21B can have the same dimensions as the manifold 21A previously set forth or can have other dimensions, as desired.

Thus, it can be seen that various combinations of this invention can be provided to permit two or more control devices to be mounted to opposite sides of a manifold that has the side walls thereof dimensioned for particular fuel control devices.

Accordingly, it can be seen that this invention not only provides a new combination of a fuel manifold and a plurality of fuel control devices mounted thereto as well as a new manifold for such a combination, but also this invention provides new methods of making such a combination and such a manifold.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a combination of a fuel manifold having a fuel receiving chamber therein and a plurality of like fuel control devices mounted to said manifold and having an inlet projections extending into said manifold to receive fuel from said chamber hereof, said manifold having a pair of opposed spaced apart substantially flat front and rear walls and a pair of opposed spaced apart substantially flat side walls interconnecting said front and rear walls together, one of said side walls having a plurality of spaced apart openings therethrough and through which said inlet projections of said control devices respectively extend, the improvement comprising the steps of forming said side walls to be spaced apart a distance that will permit two of said control devices to have said inlet projections thereof respectively extend through aligned openings in said side walls so that said two of said control devices can be respectively mounted to said manifold in aligned relation on opposite sides thereof, and securing a bracket to said manifold so as to hold two of said control devices against said one of said side walls to said manifold in spaced apart side-by-side relation by said bracket engaging against said two of said control devices and compacting said two of said control devices against said one of said side walls of said manifold with said two of said control devices having parts thereof disposed between said bracket and said one of said side walls.

2. In a method of making a combination of a fuel manifold having a fuel receiving chamber therein and a plurality of like fuel control devices mounted to said manifold and having inlet projections extending into said manifold to receive fuel from said chamber thereof, said manifold having a pair of opposed spaced apart substantially flat front and rear walls and a pair of opposed spaced apart substantially flat side walls interconnecting said front and rear walls together, one of said side walls having a plurality of spaced apart openings therethrough and through which said inlet projections of said control devices respectively extend, the improvement comprising the steps of forming said side walls to be spaced apart a distance that will permit two of said control devices to have said inlet projections thereof respectively extend through aligned openings in said side walls so that said two of said control devices can be respectively mounted to said manifold in aligned relation on opposite sides thereof, securing a bracket to said manifold so as to hold two of said control devices against said one of said side walls of said manifold, forming a threaded stud to extend outwardly from said one of said side walls, forming said bracket to have an opening therethrough and receiving said stud therethrough, and threading a nut onto said stud so as to compact against said bracket to compact said bracket against said two of said control devices that are mounted to said one of said side walls.

3. A method of making a combination as set forth in claim 2 and comprising the steps of securing another bracket to said manifold so as to hold another two of said control devices against the other of said side walls of said manifold, and disposing said other two of said control devices so as to be in aligned relation with said two of said control devices mounted to said one of said side walls.

4. A method of making a combination as set forth in claim 3 and comprising the steps of forming another threaded stud to extend outwardly from said other of said side walls, forming said other bracket to have an opening therethrough and receiving said other stud therethrough, and threading another nut onto said other stud so as to compact against said other bracket to compact said other bracket against said other two of said control devices that are mounted to said other of said side walls.

5. A method of making a combination as set forth in claim 1 and comprising the steps of securing a second bracket to said manifold so as to hold another two of said control devices against the other of said side walls of said manifold in spaced apart relation by said second bracket engaging against said other two of said control devices and compacting said other two of said control devices against said other of said side walls of said manifold with said other two of said control devices having parts thereof disposed between said second bracket and said other of said side walls and disposing said other two of said control devices so as to be in aligned relation with said two of said control devices mounted to said one of said side walls.

6. In a method of making a combination of a fuel manifold having a fuel receiving chamber therein and a plurality of like fuel control devices mounted to said manifold and having inlet projections extending into said manifold to receive fuel from said chamber thereof, said manifold having a pair of opposed spaced apart substantially flat front and rear walls and a pair of opposed spaced apart substantially flat side walls interconnecting said front and rear walls together, one of said side walls having a plurality of spaced spart openings therethrough and through which said inlet projections of said control devices receptively extend, the improvement comprising the steps of forming said side walls to be spaced apart a distance that will permit two of said control devices to have said inlet projections thereof respectively extend through aligned openings in said side walls so that said two of said control devices can be respectively mounted to said manifold in aligned relation on opposite sides thereof, securing a first bracket to said manifold so as to hold two of said control devices against said one of said side walls of said manifold, securing a second bracket to said manifold so as to hold another two of said control devices against the other of said side walls of said manifold, disposing said other two of said control devices so as to be in aligned relation with said two of said control devices mounted in said one of said side walls, disposing an endless strap sround said manifold and said second bracket, and fastening said first bracket to said strap with a fastening member.

7. A method of making a combination as set forth in claim 6 wherein said fastening member comprises a threaded fastening member and wherein said strap has an internally threaded opening threadedly receiving part of said threaded fastening member therein to fasten said first bracket thereto.

* * * * *

UNITED STATES PATENT AND TRADEMARK OFFICE
CERTIFICATE OF CORRECTION

PATENT NO. : 5,232,007
DATED : August 3, 1993
INVENTOR(S) : David D. Martin

It is certified that error appears in the above—identified patent and that said Letters Patent is hereby corrected as shown below:

Column 8, line 4, cancel "an".

Column 8, line 5, cancel "hereof" and insert --thereof--.

Signed and Sealed this

Tenth Day of May, 1994

Attest:

BRUCE LEHMAN

Attesting Officer      Commissioner of Patents and Trademarks